United States Patent [19]

Reichle

[11] Patent Number: 4,641,225
[45] Date of Patent: Feb. 3, 1987

[54] DISTRIBUTOR FRAME FOR LOW-CURRENT ELECTRICAL CIRCUITS FORMED FROM CHANNELS

[75] Inventor: Hans Reichle, Wetzikon, Switzerland

[73] Assignee: Reichle & De Massari AG Elektro-Ingenieure, Wetzikon, Switzerland

[21] Appl. No.: 644,324

[22] Filed: Aug. 24, 1984

[30] Foreign Application Priority Data

Sep. 5, 1983 [CH] Switzerland .......................... 4849/83

[51] Int. Cl.⁴ .......................... H02B 1/02; H04Q 1/14
[52] U.S. Cl. ..................... 361/429; 361/428; 379/327
[58] Field of Search ................. 179/98, 179; 339/121; 361/427–429

[56] References Cited

U.S. PATENT DOCUMENTS

| | | | |
|---|---|---|---|
| 2,191,637 | 2/1940 | Wier | 361/429 |
| 3,148,311 | 9/1964 | Conway et al. | 361/429 |
| 4,037,910 | 7/1977 | Paluch | 361/428 |
| 4,158,754 | 6/1979 | Yonezaki et al. | 361/428 |
| 4,204,095 | 5/1980 | De Luca et al. | 361/428 |
| 4,260,856 | 4/1981 | Saligny | 179/98 |

FOREIGN PATENT DOCUMENTS 2431262 1/1976 Fed. Rep. of Germany ...... 361/428

Primary Examiner—A. D. Pellinen
Assistant Examiner—Gregory D. Thompson
Attorney, Agent, or Firm—Karl F. Ross; Herbert Dubno

[57] ABSTRACT

A distribution frame for low-current conductors is made up of a multiplicity of channels whose side and rear walls are perforated to allow interconnection of the channels and whose front walls have slots to accommodate lugs of circuit units which are mounted on the frame. The front walls define an opening between them which is flanked by respective inwardly extending flanges formed with rearwardly angled flanks carrying cable ridges between the tongues of which the conductors can be fitted.

8 Claims, 4 Drawing Figures

DISTRIBUTOR FRAME FOR LOW-CURRENT ELECTRICAL CIRCUITS FORMED FROM CHANNELS

FIELD OF THE INVENTION

The present invention relates to a frame system for low-current installations, in particular for electric current distributor systems, composed of a plurality of units arranged in a mechanical assembly, the units comprising in particular, by means of transverse trussings, connectable vertical supports and connection modules attached directly or indirectly thereon.

BACKGROUND OF THE INVENTION

It is generally known that in telephony or other areas of signal transmission, frame systems of the previously-mentioned type are constantly gaining in importance in order to be able to wire the considerable and growing numbers of conductors both clearly and rationally.

The construction of such frame systems and the mechanical assembly technique should enable the assembly of the frames out of standardized sections on the basis of a model, plan or the like.

This, however, can be achieved only imperfectly by the utilization of mere channel sections, which as a rule are suitable only as wall distributors, whereas for independent distributors, a complicated additional frame construction is required. Moreover, the outwardly jutting edges of the vertical profiles are a source of the highest danger of injury for the person working on the frame. Further, diagonal trusses or the like have to be attached to the fronts of the open channel sections onto which, the connection modules can be attached only when the trusses are removed.

OBJECT OF THE INVENTION

Therefore, it is a primary object of the present invention to provide an improved frame system for low-current installations, in particular for distributor systems, which meets all of the above-mentioned requirements and permitting, with few basic elements, the formation of an individual versatile assembly adapted for handling without the danger of injury.

SUMMARY OF THE INVENTION

According to the invention these and further objects are obtained by an array of vertical supports which are self-supporting pillars having a box section or channel, which are open at one side of the array, the open-side having a pair of longitudinal front walls forming joining surfaces, which are parallel to the backwall of the pillar, and each of which is bent inwardly at the opening to form mutually parallel wall sections of the pillars flanking the opening, with at least the backwall, the front joining surfaces, and the side walls of the pillars, having perforations for the detachable anchorage of the pillars with one another, or to further units of the system on the pillars.

This creates a frame system which is able to meet all necessary requirements sufficiently and, in particular, permits, with few basic elements, an individual assembly with an extensive range of applications and handling without the danger of injury.

In order to bring the injurious open-side longitudinal edges on the pillar still farther inwards away from the person working on the distributor, I have found it to be advantageous to form each of the open-side longitudinal edges of the pillar on a further wall section adjoining the respective front-wall.

Moreover, there exists the possibility of mounting cable ridges onto the open-side longitudinal edges of the pillar, for which, preferably, the cable ridges comprise tongues projecting from a longitudinal bar, with the longitudinal bar formed as a U-shaped slip-on clamp. This permits in an advantageous manner, that the tongues of the cable ridges define, together with the walls of the pillars, at least approximately closed cable ducts.

To prevent wire breakage during insertion of the individual wires or bundle of wires into the spacings defined by the tongues, it is, moreover, of advantage if each tongue of the cable ridges is oblique to the longitudinal direction of the longitudinal bar. In addition, the plane of extension of each of the oblique tongues and the plane of extension of the longitudinal bar form an acute angle with one another. A lateral spacing is formed between the free ends of the neighboring tongues, the lateral spacings being, perpendicular to the plane of extension of the tongues, and essentially larger than the spacing of the neighboring separating edges in the longitudinal direction of the longitudinal bar.

In a further development of the frame system according to invention, it is of advantage for increasing the range of applications, if the perforations in the front joining surfaces of the pillars or parts are formed as horizontal slots for the plugable installation of the connection modules, while and the perforations in the side walls of the pillars are boreholes that serve for the installation of further system units. This permits a wiring bracket, plugable on the front joining surface of the pillar, to be provided for ease of wiring of the modules, which are otherwise difficult to access. In addition, a further system unit can be a test desk. Furthermore, it is possible that in the region of the parallel-running wall section on the pillar, small cover plates with rear spring means are attachable in a clamping manner.

BRIEF DESCRIPTION OF THE DRAWINGS

The invention will be better understood and objects other than those set forth above will become apparent when consideration is given to the following detailed description. Such description makes reference to the annexed drawings in which.

SPECIFIC DESCRIPTION

Figure 1:
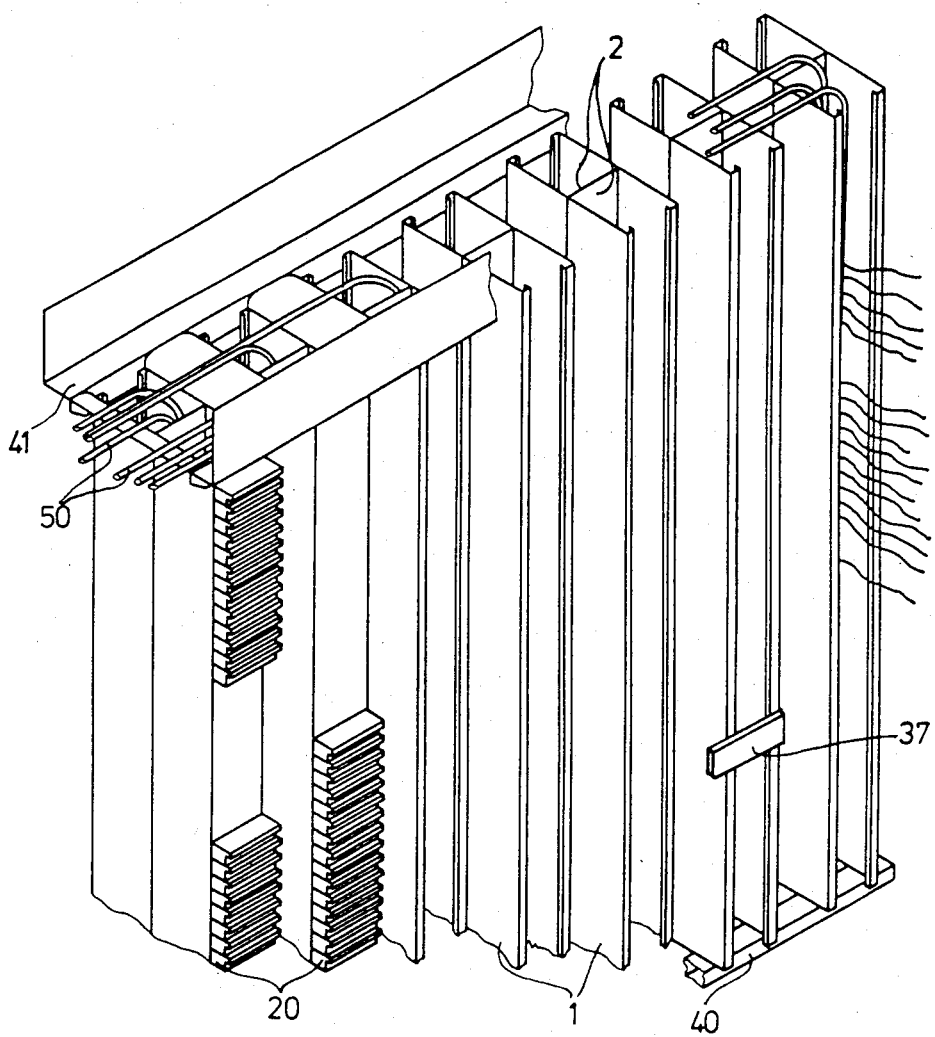
FIG. 1 is a diagrammatic partial perspective view of a frame system according to invention.

The frame system for low-current installations, in particular for electric-current distribution systems, illustrated in FIGS. 1 to 4, consists of vertical supports 1, which are self-supporting pillars having a box section or channel shape, which are open at a front side thereof, i.e. codirectionally along one side of the array of channels. The open-side longitudinal edges 5 of the channel are bent from a joining surface 3 which is parallel to the backwall 2 of the pillar. These edges are each bent inwardly to form a wall section 4 parallel to the side walls 6 of the pillars. In particular, FIGS. 2 and 3 clearly illustrate, that each of the open-side longitudinal edges 5 of the pillars 1 is formed on a further wall section or flange 4' adjoining the respective wall section 4, extended toward the respective side wall 6.

Further, it can be seen that the backwall 2, the frontside joining surfaces 3 and the side walls 6 of the pillars have respective perforations 9, 7 or 8 for the detachable anchorage of the pillars 1 with one another, and of further units of the system on the pillars, as is described in more detail below.

In accordance with FIG. 1, a plurality of pillars 1 are arranged next to one another, with specified spacing between them, and with backwalls 2 of two channels back-to-back, constituting an independent distribution frame for which only a longitudinal bottom sill 40 and a top frame 41 are required, with the latter, if desired, formed as a crossconnection duct for the cables 50 that are to be connected. Onto the front side joining surfaces 3 of the pillars 1, an appropriate number of connection modules 20 and, if necessary, cover plates 37, are mounted in the region of the parallel-running wall sections 4 on the pillars 1. The cover plates 37 are attachable with rear spring means in a clamping manner.

For attaching first the connection modules 20, the perforations 7 on the joining surfaces 3 of the pillars 1 are formed as horizontal slots for the plugable installation of the connection modules 20. Accordingly, one of the connection modules 20' possess rearside connection hooks 7'. In the same manner, it is possible to attach a so-called wiring bracket 23 temporarily onto the frame, onto which the modules 20 can be plugged for wiring.

Figure 2:
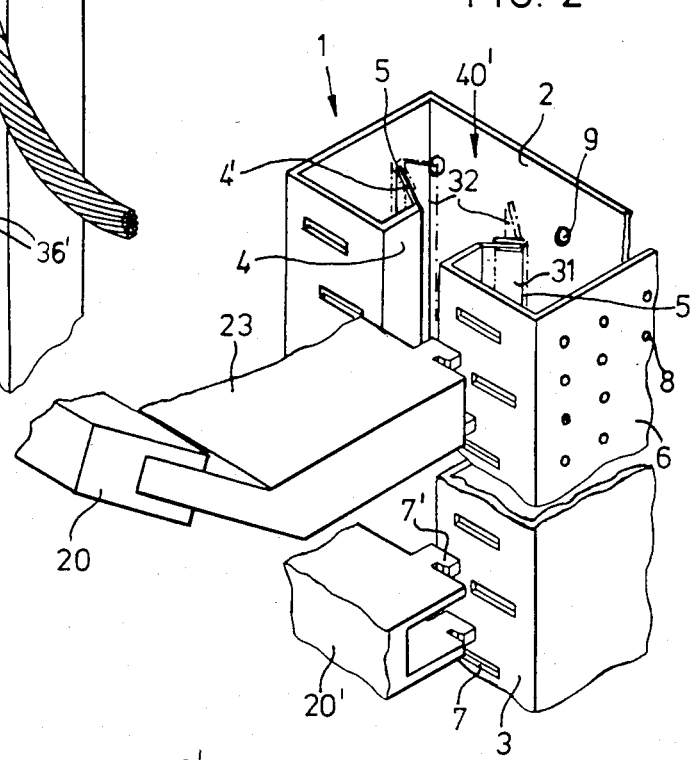
FIG. 2 is a diagrammatic partial perspective view on a larger scale of an individual system unit in combination with devices attached thereto.
Figure 4:
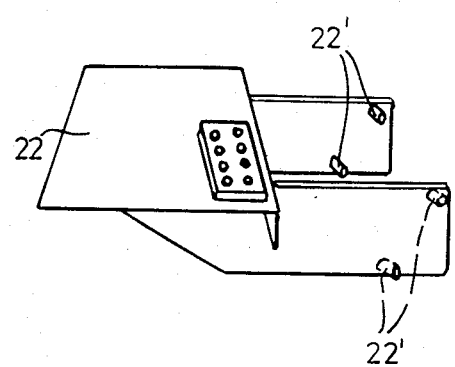
FIG. 4 is a diagrammatic representation of further system unit usable on the frame system.

Further, FIG. 2 illustrates in particular that the perforations 8 on the side walls 6 of the pillars 1 are system boreholes which serve for the installation of further system units. Such a system unit is, for example, a test desk 22, in accordance with FIG. 4, which is temporarily and laterally attachable by plugging the lateral pins 22' thereof into the perforations 8.

Figure 3:
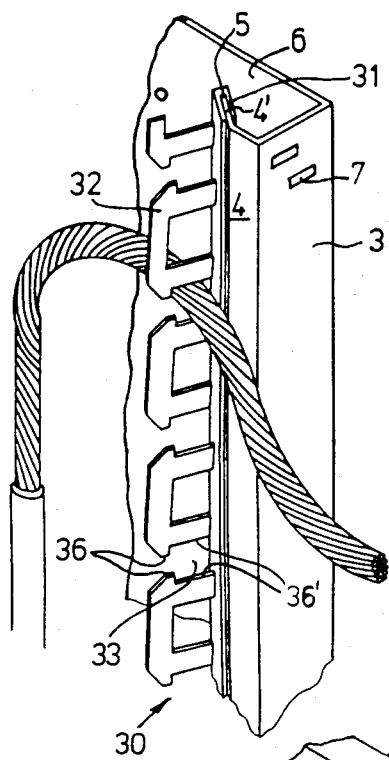
FIG. 3 is a diagrammatic partial perspective view on a larger scale of a further detail of the frame system according to invention.

As is shown in FIGS. 2 and 3 in particular, a very advantageous specific embodiment of the arrangement is in the form of cable ridge 30 plugged onto the openside longitudinal edges 5 of the pillars 1, for which the cable ridges 30 comprise tongues 32 projecting from a longitudinal bar 31, with the longitudinal bar formed as a U-shaped slip-on clamp engaging the flange 4'. This permits in an advantageous manner the tongues 32 of the cable ridges 30 to define, together with walls 2,3,4,4' and 6 of the pillar 1, at least approximately closed cable ducts 40'.

In the configuration of cable duct 40', according to FIG. 3, the tongues 32 are adjacent to one another at their free ends 36 and, nearer the longitudinal bar 31 define, with the respective neighboring tongues 32, a clearance 33 for passing through an individual wirre or a bundle of wires, each tongue, in accordance with the invention, lies oblique or inclined to the longitudinal direction of the longitudinal bar 31, with the plane of extension of the oblique tongues and the plane of extension of the longitudinal bar 31 forming an acute angle (FIG. 2), the lateral spacing formed between on the free ends 36 of neighboring tongues 32 by the incline thereof being perpendicular to the plane of extension of the tongues 32, and is essentially larger than the spacing of the neighboring separating edges 36 in the longitudinal direction of the longitudinal bar 31. The arrangement is such that the spacing of the neighboring free ends of the tongues in the longitudinal direction of the longitudinal bar is smaller than the diameter of a single wire inserted through the cable ridge (see FIG. 3).

Because of the obliqueness of the tongues at a given angle to the longitudinal direction of the cable ridge with given spacings of the free ends of the tongue in a transverse direction, even with practically zero-spacing of the free ends 36 of neighboring tongues in the longitudinal direction, each individual wire can be pressed with ease between two neighboring tongues.

The very small spacing of the free ends in the longitudinal direction of the cable ridge ensures that a single wire or bundle of wires, passed through the cable ridge at an approximate right angle to the plane of the tongues (FIG. 3), cannot slip out unintentionally.

Thus, from the foregoing description, there results a frame system for low-current installations, in particular for distributor systems, that meets all arising requirements and, particularly, permits, with few basic elements, a very individual assembly with an extensive range of applications and with an optimum handling with regard to the danger of injury.

While there are shown and described preferred embodiments of the invention, it is to be distinctly understood that the invention is not limited thereto but may be embodied and practiced within the scope of the following claims.

What I claim is:

1. An electrical current distribution frame, comprising:
    a plurality of laterally interconnected channels each having a rear wall, a pair of lateral walls, a pair of front walls extending from said lateral walls toward one another and defining a frontwardly open slot between them, said front walls being parallel to said rear wall, respective inwardly extending mutually parallel wall sections connected to said front walls flanking said slot, and respective flanges connected to said wall sections and diverging from one another toward said rear wall, said flanges having longitudinal edges;
    respective horizontal slots formed on said front walls of each channel for receiving connection hooks of circuit units to be mounted on said frame;
    respective bores formed on the remaining walls of each channel for interconnection of said channels laterally; and
    respective cable ridges mounted on each of said longitudinal edges of each channel, disposed in the respective channel and formed with spaced-apart tongues for retaining conductors passed therebetween.

2. An electrical current distribution frame, comprising:
    a plurality of laterally interconnected channels forming self-supporting pillars and each having a rear wall, a pair of lateral walls, a pair of front walls extending from said lateral walls toward one another and defining a frontwardly open slot between them, said front walls being parallel to said rear wall, respective inwardly extending mutually parallel wall sections connected to said front walls and flanking said slot, and respective flanges connected to said wall sections and diverging from one another toward said rear wall, said flanges having longitudinal edges;

respective formations on said front walls of each channel for receiving connection hooks of circuit units to be mounted on said frame;

respective bores formed on the remaining walls of each channel for interconnection of said channels laterally; and respective cable ridges mounted on each of said longitudinal edges of each channel, disposed in the respective channel and formed with spaced-apart tongues for retaining conductors passed therebetween, each of said cable ridges being formed with a U-section bar slipped over the respective edge of a respective one of said flanges, said bar being provided with an array of said tongues set obliquely to a longitudinal direction of said bar.

3. The electrical distribution frame defined in claim 2 wherein said tongues of said cable ridges define with said walls of each pillar a substantially closed cable duct.

4. The electrical distribution frame defined in claim 2 wherein the planes of said tongues of the respective cable ridges include acute angles with the planes of the respective flanges, said tongues having free ends projecting toward free ends of neighboring tongues and defining gaps between them to permit conductors to be inserted between said free ends, said free ends projecting beyond respective neighboring separating edges of said tongues where spacing between the separating edges carrying the free ends of neighboring tongues projecting toward one another is greater than that between said free ends.

5. The electrical distribution frame defined in claim 2 wherein the formations on said front walls are horizontal slots for the pluggable installation of connection modules forming said circuit units.

6. The electrical distribution frame defined in claim 2, further comprising a wiring bracket into which a connection module can be plugged, said wiring bracket being mounted in said slots of said front walls.

7. The electrical distribution frame defined in claim 2, further comprising a test desk having lateral pins projecting into said bores mounting said test desks on one of said pillars.

8. The electrical distribution frame defined in claim 2, further comprising a cover plate mounted on said front walls.

* * * * *